US011843946B2

(12) United States Patent
Cafasso et al.

(10) Patent No.: US 11,843,946 B2
(45) Date of Patent: Dec. 12, 2023

(54) DEVICE-SPECIFIC WIRELESS ACCESS POINT PASSWORD AUTHENTICATION

(71) Applicant: Cujo LLC, El Segundo, CA (US)

(72) Inventors: Matteo Cafasso, Helsinki (FI); Leonardas Marozas, Vilnius (LT)

(73) Assignee: Cujo LLC, Covina, CA (US)

( * ) Notice: Subject to any disclaimer, the term of this patent is extended or adjusted under 35 U.S.C. 154(b) by 379 days.

(21) Appl. No.: 17/220,439

(22) Filed: Apr. 1, 2021

(65) Prior Publication Data

US 2022/0322089 A1 Oct. 6, 2022

(51) Int. Cl.
| | |
|---|---|
| H04L 29/06 | (2006.01) |
| H04L 29/08 | (2006.01) |
| H04W 12/06 | (2021.01) |
| H04W 48/04 | (2009.01) |
| H04W 8/00 | (2009.01) |
| H04W 84/12 | (2009.01) |

(52) U.S. Cl.
CPC ......... *H04W 12/068* (2021.01); *H04W 8/005* (2013.01); *H04W 48/04* (2013.01); *H04W 84/12* (2013.01)

(58) Field of Classification Search
CPC .... H04W 12/068; H04W 8/005; H04W 48/04

USPC .............................................................. 726/6
See application file for complete search history.

(56) References Cited

U.S. PATENT DOCUMENTS

| | | | | |
|---|---|---|---|---|
| 2018/0070231 | A1* | 3/2018 | Barbu | H04W 12/06 |
| 2020/0068192 | A1* | 2/2020 | Pelski | H04N 23/90 |
| 2020/0081410 | A1* | 3/2020 | Walker | F16K 37/0041 |
| 2020/0118084 | A1* | 4/2020 | Farmer | G06F 21/335 |
| 2020/0162915 | A1* | 5/2020 | Dhammawat | H04W 12/068 |
| 2020/0175032 | A1* | 6/2020 | Gibson | G06F 16/258 |

FOREIGN PATENT DOCUMENTS

| | | | | | |
|---|---|---|---|---|---|
| CN | 111385117 | A | * | 7/2020 | ......... H04L 41/0631 |
| CN | 112492542 | A | * | 3/2021 | ............. B60R 25/24 |

\* cited by examiner

*Primary Examiner* — Haresh N Patel
(74) *Attorney, Agent, or Firm* — Dority & Manning, P.A.

(57) ABSTRACT

There is provided a method that comprises receiving one or more unique passwords for identifying respective one or more user devices of the wireless local area network; associating the one or more unique passwords with the respective one or more user devices and storing the one or more unique passwords to a database; in response to receiving, at an access point of the wireless local area network, a connection request from a user device, requesting, from the user device, a unique password of the user device; and identifying the user device based on the unique password.

18 Claims, 4 Drawing Sheets

DEVICE-SPECIFIC WIRELESS ACCESS POINT PASSWORD AUTHENTICATION

TECHNICAL FIELD

The present application relates generally to network security, and specifically to identifying devices in a computer network.

BACKGROUND

It is vital to identify network devices in a computer network to enable, for example, controlling access to computer networks or services, applying required communication policies, and/or preventing and monitoring unauthorized access.

It is desirable to have reliable solutions enabling identification of devices in computer networks.

SUMMARY

According to an aspect of the invention there is provided a method as specified in claim 1.

According to other aspect of the invention, there is provided an apparatus in a computer network system as specified in claim 10.

According to other aspect of the invention, there is provided a non-transitory computer-readable medium comprising stored program code, the program code comprised of computer-executable instructions that, when executed by a processor device, causes the processor device to operate as specified in claim 19.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
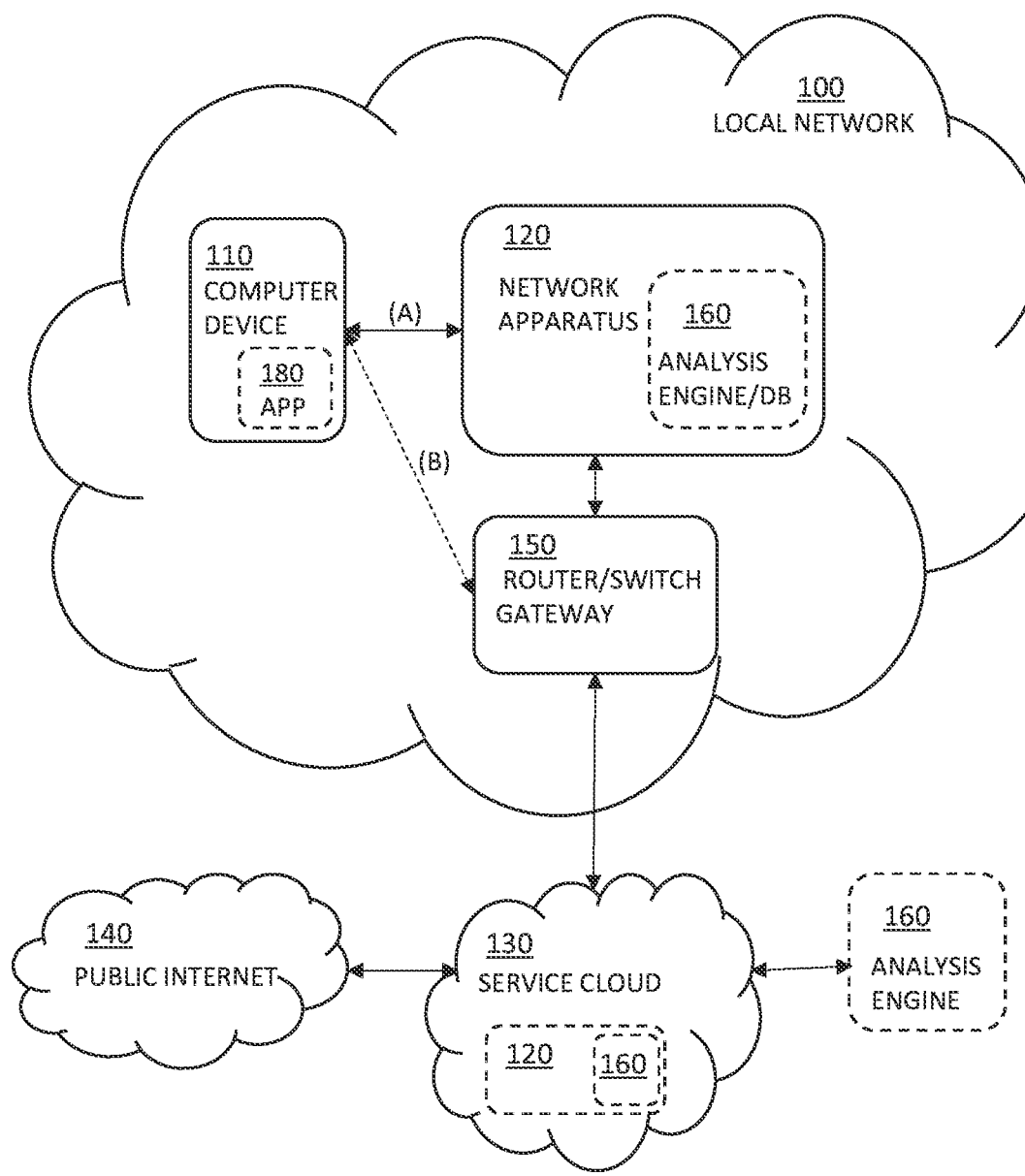
FIG. 1 is a block diagram illustrating an example system environment for a network apparatus in a computer network system.

FIG. 1 illustrates schematically an example of a system environment for a network apparatus 120. The system environment illustrated in FIG. 1 includes a computer network 100, such as a local network, that may include one or more computer devices 110, the network apparatus 120, a local router/switch 150, and an analysis engine and a database 160. The computer devices 110 may also comprise any number of client applications 180, however, this is not required. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smart phone, a laptop, or a tablet having a network interface and an ability to connect to the network apparatus 120 and/or the local network router 150 with it. The network apparatus 120 collects information (e.g., about the computer network 100), including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the Internet 140 or computer network 100. In some embodiments, the device 110 executes an application (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. At least some of these devices are connected to the Internet 140, for example, via one or more Wi-Fi access points.

Device identification in computer networks is an essential part of any mobile device management solution as well as of services providing protection or access control. Device identification in this context may be described as an assignment of a unique identifier which can be used to identify a device, for example. It is common to set specific access rules that may be applicable only to specific devices and provide access to sensitive resources because misidentification of a device could cause undesired after conditions such as leakage of sensitive data or theft. Known device identification methods focus for identification based on what data the devices are sending to the network (e.g. network data analysis-based agentless identification systems) or based on what data is gathered by the agent deployed on the device.

It is also common to rely on network behavior of the devices to fingerprint them. Fingerprinting is a process of identification and categorization of a device. Categorization of a device may comprise the assignment of different properties that may describe one or more of: a device model, a device type, and a device brand. The behavior, in turn, may be determined based on a collection of data points such as network addresses (media access control (MAC), Internet Protocol (IP)), internal network protocols (multicast domain name system (MDNS), dynamic host configuration protocol (DHCP), simple service discovery protocol (SSDP), protocol headers (HHTP) and payloads (User Agent, domain name system (DNS)). The fingerprinting approach is effective when the aim is to categorize a given device such as, for example, a specific device model running a specific operating system version. A unique set of network behavior characteristics form a distinctive fingerprint that is verified every time a fingerprinted device is communicating on the network. However, all the mentioned behavior is driven by software and can be changed at any point in time by an attacker, the device manufacturer (vendor) or the user. A way to circumvent many security solutions is to change the network-based identification data, such as a MAC address and/or a hostname, of a device to trigger a new device fingerprinting process. This results in misleading behavior of the device and to the security mechanism to believe that the device is a new one and of a different kind. Similar issues are faced with devices that periodically change their MAC address, for example. Since the MAC address is one of core data points used to uniquely identify a device, changing of the MAC address leads a security solution to believe the device is a new one leading to duplicates.

Embodiments of the present invention overcome the drawbacks of the previous solutions by enabling identifying devices in a computer network in ways that are more resilient to behavioral anomalies. This can be done by not relying solely on what device is transmitting on the network but by adding an additional layer of controlled identification on top of device behavior characteristics.

Local area networks, such as small office and domestic networks, may contain multiple IoT and smart devices as well as portable computer and tablets. Each of these devices may be connected to the Internet through one or more Wi-Fi access points. The network apparatus 120 may run on the central router of the network perimeter and have visibility over all connections. When a device is connected to the router, the network apparatus checks the MAC address of the device and other behavioral data if it is a new device to the network or an already known one. Thus, if an already known device changes its MAC address and re-connects, it can be identified as a new one. Adding any other behavioral information, such as a hostname, would strengthen this mechanism but not solve a problem related to the fact that information can be programmatically changed as well.

Embodiments of the present invention overcome the drawbacks of the previous solutions by enabling identifying devices in ways that are more resilient to behavioral anomalies. This is enabled by replacing the need to use device MAC address and/or other network behavioral data as a marker for its unique identification with an explicit contract between the device user and the Wi-Fi access point. In one embodiment, this can be implemented by employing a Wi-Fi Protected Access (WPA) protocol by enforcing the use of a dedicated password (WPA password) per each device, for example. These passwords may be used to generate unique identifiers for the devices.

When a new device is connecting to a protected Wi-Fi access point, a unique passphrase needs to be created for such device. The passphrase can be created on an appliance portal by a network owner in case the device is an unattended device as most of the IoT devices are or if the network owner wants to be in control of which devices are connecting to the network.

Further, for attended devices (e.g., a smartphone, a tablet computer, a laptop computer, etc.), the users may be enabled to create passwords themselves without the need of intervention from the network owner. In this case, a user may first need to connect to a Gateway Wi-Fi service set identifier (SSID). The Wi-Fi network may be WPA protected for home networks or free in case of public networks (e.g., cafes, airports). Once connected, the user may be re-directed to a captive portal via the device browser in which the user is requested to create a unique password or passphrase to continue. Once the password/passphrase creation process has been concluded, the user may be instructed to use the newly created unique password/passphrase to connect to the real Wi-Fi SSID.

As each device employs its own password/passphrase to connect to the protected Wi-Fi access point, the password/passphrase itself may be used to identify the device. This can be done, for example, by using the password/passphrase as a seed for the generation of a unique identifier or by hashing its content. Any behavioral change caused by the device software/hardware would not affect the device identification process anymore. These behavioral changes could be analysed to better understand the device profiles when it comes to their attempts to become un-identifiable or remodel the device network profile based on the new network datapoint knowledge in conjunction with user provided passphrases.

This method introduces an additional layer of device identification that reduces the need for complex datapoint extraction and evaluation to existing network profiles. As an example of Android devices with MAC randomization enabled, each vendor provides distinct implementations of how MAC randomization is accomplished and what markers are visible and can be used to deduce about the original device's profile.

The method enables a solution that can be seamlessly applied to all device categories and that is not dependent on unreliable device identification methodologies. Further, devices may be identified prior to connection and their behavior is employed for the categorization process. Networks having high device turnover such as airports and Internet cafes could also impose a Time to Live (TTL) to passwords/passphrases leading to their deletion as well as for any associated devices thereof.

Embodiments of the present invention further overcome the drawbacks of the previous solutions by enabling ceasing of existence of a public, non-encrypted network. As each protected network would require a device dedicated password/passphrase to connect, all connections would be WPA protected. Thus, an effective solution against problems related to non-encrypted public networks is also provided.

Embodiments of the present invention further improve the security of a Wi-Fi network by reducing what is a one-to-many relationship type of secret (a password/passphrase) to a one-to-one. This enables any possible damage deriving from a leak of a Wi-Fi passphrase being greatly reduced since that passphrase is not shareable between devices. For example, if a network owner's Wi-Fi password would be leaked, anyone could connect to his/her home network.

However, by using an embodiment of the present invention, only the network owner's device could use that password to connect.

Another important security aspect is related to public networks. Currently, when connecting to a public network, such as at a cafe, an airport, or a library, device users are usually re-directed to a captive portal where accepting specific terms and conditions or some other authentication within the system may be required. After this, it is allowed to browse the network on the same open Wi-Fi connection. As there is no WEP (Wired Equivalent Privacy)/WPA involved, the connection to this network will not be protected from spoofing the non-encrypted communication by anyone. Embodiments of the present invention enable using a protected Wi-Fi network where any wireless protection algorithm protected password may be generated for the devices, and the users of the devices may be prompted to use it to connect to the Internet. This removes the risk from using unsecure public connections as they become WEP/WPA protected, for example.

Figure 2:
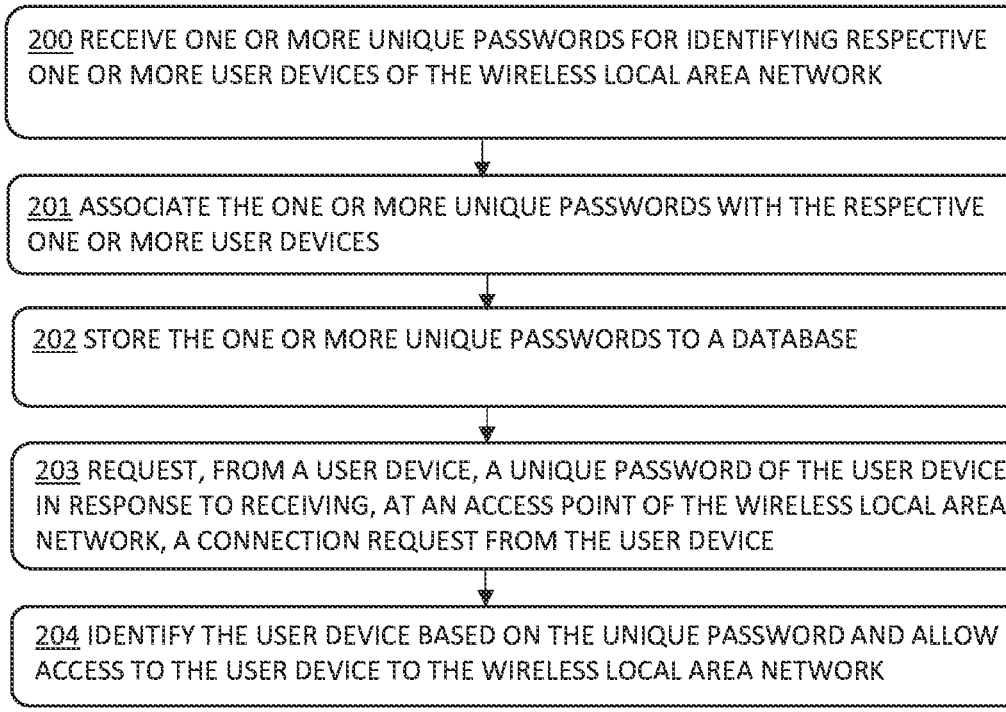
FIG. 2 is a flowchart illustrating a process, according to one embodiment.

FIG. 2 is a flow diagram illustrating an embodiment of a method.

In 200, one or more unique passwords for identifying respective one or more user devices of a wireless local area network is received.

In 201, the one or more unique passwords are associated with the respective one or more user devices.

In 202, the one or more unique passwords are stored to a database.

In 203, in response to receiving, a connection request from a user device, a unique password of the user device is requested from the user device.

In 204, the user device is identified based on the unique password, and access to the wireless local area network is allowed to the user device.

In an embodiment, the unique password is generated by a network owner on an appliance portal of the wireless local area network or by a device owner on a captive portal.

In an embodiment, the method comprises employing a wireless local area network protected access (WPA) protocol for enforcing use of the unique password for each user device of the one or more user devices. In an embodiment, any wireless protection algorithm can be used with the method, such as a WE P or a WPA or any version or future implementation of such.

In an embodiment, the association of the one or more unique passwords with the respective one or more user devices further comprises generating an identifier for each user device based on each unique password of each user device.

In an embodiment, the method comprises detecting, by a wireless computer network access point, a new user device of the wireless local area network and requesting a unique password of the new user device from a user of the new user device.

In an embodiment, the method comprises allowing the user device to access the wireless local area network after identifying the user device based on the unique password, and blocking any other user device that uses the same unique password from accessing the wireless local area network.

In an embodiment, the method comprises in response to detecting the unique password of the user device being already in use by another user device of the wireless local area network, requesting a new unique password from the user device and alerting a network owner.

In an embodiment, the method comprises monitoring the behavior of the one or more user devices connected to the wireless local area network during a first time period and, during a second time period, comparing behavior of a first user device using a first unique password during the first time period with behavior of a second user device using the same first unique password during the second time period and, in response to detecting that a difference score between the behavior of the first user device and the behavior of the second user device exceeds a predetermined threshold based on the comparing the behavior of the first user device and the behavior of the second user device, taking further action to protect the wireless local area network.

In an embodiment, taking further action to protect the wireless local area network comprises one or more of: revoking an abused password, escalating a security incident, and sending a notification to an owner of the wireless local area network.

Figure 3:
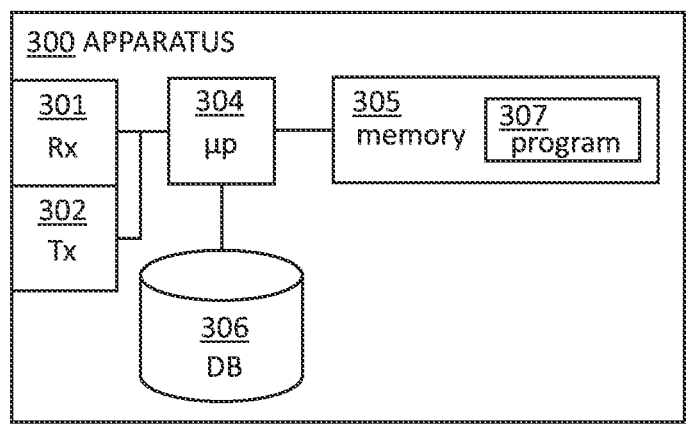
FIG. 3 is a block diagram illustrating an apparatus, according to one embodiment.

FIG. 3 illustrates an apparatus that provides an example of a network apparatus such as a router, a switch, a 5G modem, or other network-level apparatus.

A processor 304 is provided that is configured to identify devices in the monitored computer network. The processor 304 is configured to receive one or more unique passwords for identifying respective one or more user devices of the wireless local area network, and to associate the one or more unique passwords with the respective one or more user devices. The processor 304 is further configured to store the one or more unique passwords to a database, to request a unique password from a user device in response to receiving, at an access point of the wireless local area network, a connection request from the user device, and to identify the user device based on the unique password.

In an embodiment, the processor 304 may be configured to store device behavior-related data such as any data related to device models, versions, types, and network-based identification data, metadata, attributes, values, MAC addresses, hostnames as well as other data related to connection requests, state information and/or domain data to the database 306. The database 306 is shown in this example as being located at the apparatus 300, but it will be appreciated that the apparatus 300 may alternatively access a remote database. The database 306 may comprise necessary data collected from user devices and/or the passwords/passphrases used to identify the user devices.

The apparatus 300 is provided with a receiver 301 that receives the connection requests and responses. A transmitter 302 is also provided for communication with the computer device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processor.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all the functions of the method can be implemented in any apparatus, for example any user device or a server.

Figures 4A, 4B:
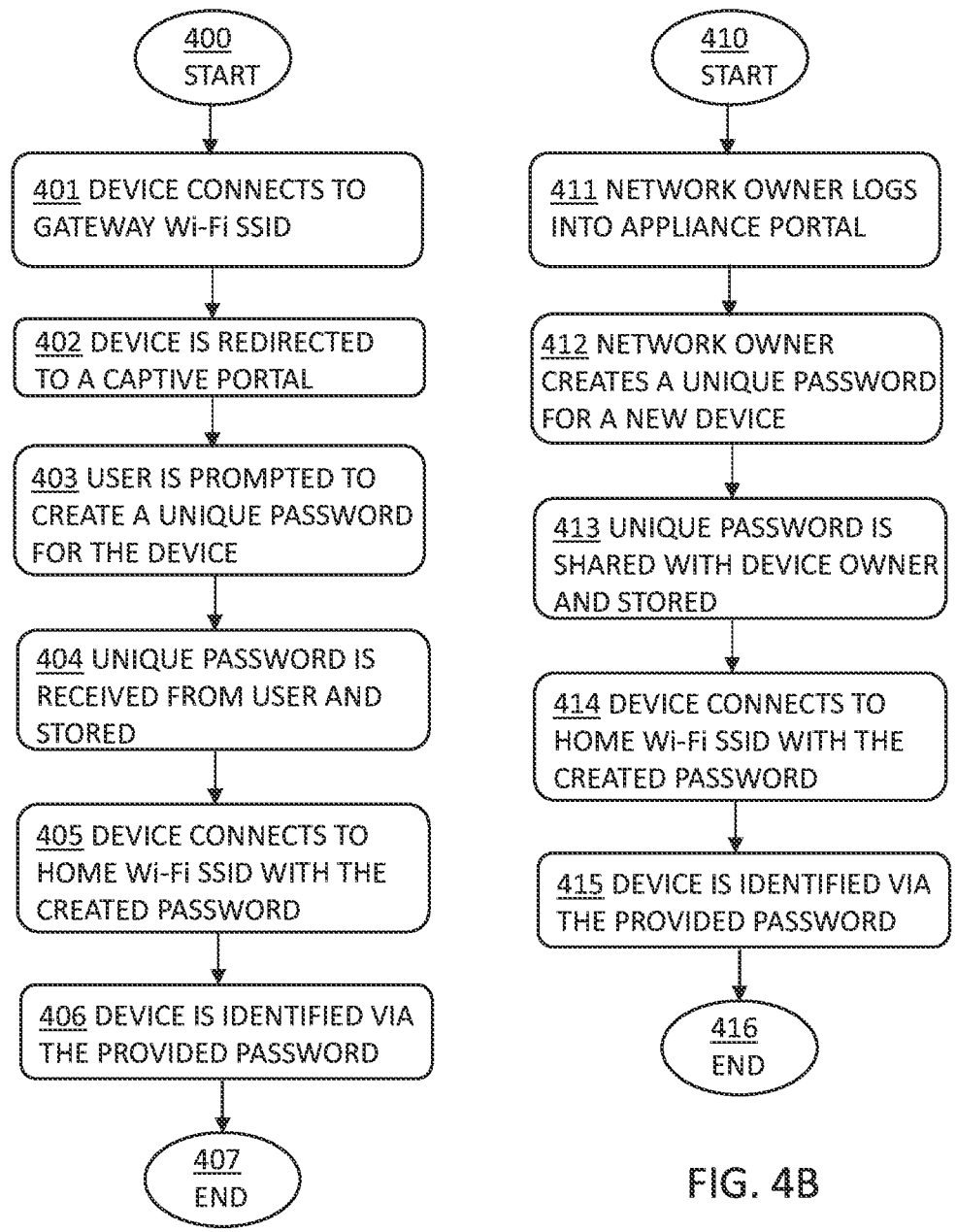
FIGS. 4A and 4B are flowcharts illustrating processes, according to embodiments.

FIG. 4A is a flowchart illustrating an example of how a new passphrase may be created for an attended device.

The process starts in 400. In 401, the device connects to a gateway Wi-Fi service set identifier (SSID). In 402, the device is redirected to a captive portal. A captive portal may be a web page that the user of the network device is required to view and interact with before access process can be continued. In 403, a user of the device is prompted to create a unique password for the device. In 404, the unique password is received from the user and stored to a database. In 405, the device connects to a home Wi-Fi SSID with the created password, and in 406, the device is identified based on the provided password. The process ends in 407.

FIG. 4B is a flowchart illustrating an example process of how a new passphrase may be created for an un-attended device.

The process starts in 410. In 411, a network owner logs into an appliance portal after receiving an access request from a new device or a device owner to the network. In 412, the network owner creates a unique password for the new device. In 413, the unique password is shared with the owner of the new device (by any appropriate method) and stored to a database. In 414, the new device connects to the network (e.g., home Wi-Fi SSID) with the created password. In 415, the new device is identified based on the password. The process ends in 416.

In an embodiment, if all devices may store the association SSID passwords, then the above process may be carried on only once per device. Even if the device would lose the password, the network owner could still maintain the association by generating a new one.

The sharing of a password/passphrase between multiple devices would lead to mis-categorization of the devices as the system could believe them to be a single one. To prevent sharing of the unique passwords assigned to specific devices between multiple devices, which would lead to password collisions, the method may further comprise detecting possible password collisions and allowing only one user device using the same unique password at a time to connect to the network. In an embodiment, in response to detecting a second device connecting to the protected Wi-Fi access point using the same password, it may be directed to a captive portal requesting to create a unique passphrase, and the network owner would be alerted regarding the incident. The above mechanism may discourage users' misbehavior as they would end up competing for a Wi-Fi connection.

Since devices cannot change their properties, such as a device type, a brand or a model, the detection of a password collision may also be based on analysing the properties of the devices. The device properties may be associated to the respective devices and their passwords, and finally a probability that the password does not belong to a specific device may be determined based on detecting that the properties of a device accessing the network do not match to the properties that are associated with the device in a database. In an embodiment, the behavior of any devices connected to the network apparatus may be classified and categorized. Two or more devices sharing the same password/passphrase in different times would show different behavior, and this can be detected. For example, two mobile phones of different brands behave very differently. If both mobile phones connect using the same password/passphrase, then this anomaly would be immediately detected. Appropriate remediation measures could then be applied. Such measures may be configured by the network owner, for example, or by security experts. Example remediations comprise one or more of: manual or automatic revocation/invalidation of the abused password/passphrase, blocking a suspicious device, or escalation of a security incident to both the network owner and to a security service provider.

Figure 5:
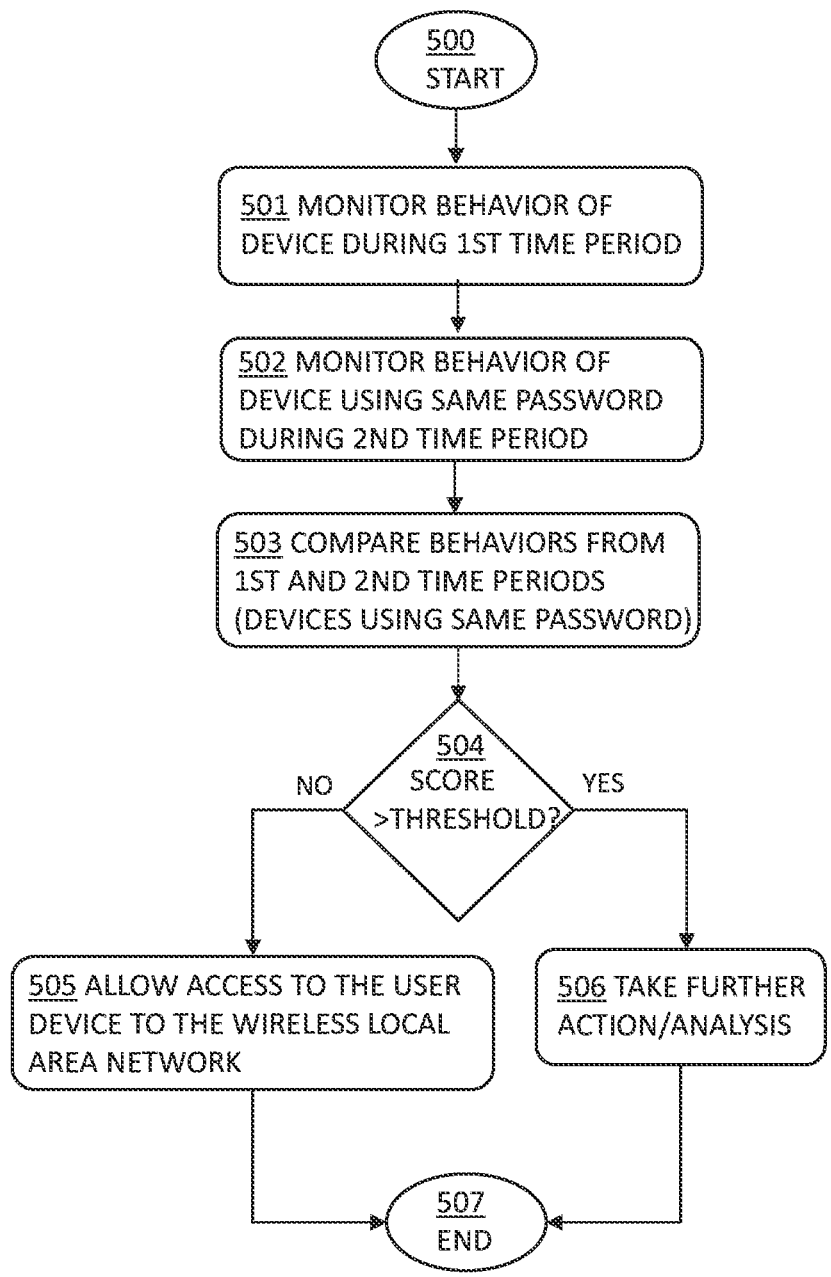
FIG. 5 is a flowchart illustrating a process, according to an embodiment.

FIG. 5 is a flowchart illustrating a process, according to an embodiment.

The method starts in 500. In 501, behavior of a first device is monitored during a first time period. Any data related to the behavior of the first device may be collected and stored. In 502, behavior of a second device using the same password as the first device during the first time period is monitored during a second time period. In 503, the behavior-related data collected and stored during the 1st and the 2nd time periods that are associated with the same password are compared. In an embodiment, a difference score may be predetermined for analyzing the results of the comparison. In 504, it is determined whether the difference score exceeds a predetermined threshold. If not, then 505 is entered where access to the network may be allowed to the second user device, and no further action is required. In case, in 504, the score exceeds the predetermined threshold, then 506 is entered where further action or analysis will be done. Any further analysis may be made automatically or by a human analyst, for example. Depending on the result of the analysis, an access may be allowed or rejected, for example. In an embodiment, the difference score and/or predetermined thresholds may be assigned based on the device model, device behavior data, and/or any rules. The difference score/threshold may be determined by using decision rules, statistical analysis or applying artificial intelligence.

Networks having high turnover of connected devices such as airports and Internet cafes could see a large amount of short-lived unique passphrases/passwords, which may increase the risk of collisions and re-use. Thus, in an embodiment, the network owner may be allowed to configure global and per password/passphrase expiration dates. Once an inactive password/passphrase has expired, then it is removed from the list of active passwords/passphrases, and any new device may be associated with it.

It will be appreciated that various modifications may be made to the above-described embodiments without departing from the scope of the present invention. For example, the database or analysis engine may be in separate entities to the apparatus; in which case, the apparatus will send queries remotely to the analysis engine.

The steps, signaling messages, and related functions described above in relation to the figures are in no absolute chronological order, and some of the steps may be performed simultaneously or in a different order. Other functions may also be executed between the steps, and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers.

The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for receiving one or more unique passwords for identifying respective one or more user devices of the wireless local area network, a code of associating the one or more unique passwords with the respective one or more user devices and storing the one or more unique passwords to a database, a code for requesting a unique password from the user device, and a code for identifying the user device based on the unique password.

Although the invention has been described in terms of preferred embodiments as set forth above, these embodiments are illustrative only, and the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising, at a wireless local area network:
   receiving one or more unique passwords for identifying respective one or more user devices of the wireless local area network;
   associating the one or more unique passwords with the respective one or more user devices;
   storing the one or more unique passwords to a database;
   in response to receiving, at an access point of the wireless local area network, a connection request from a user device, requesting, from the user device, a unique password of the user device;
   identifying the user device based on the unique password;
   monitoring the behavior of the one or more user devices connected to the wireless local area network during a first time period and during a second time period;
   comparing behavior of a first user device using a first unique password during the first time period with behavior of a second user device using the same first unique password during the second time period; and
   in response to detecting that a difference score between the behavior of the first user device and the behavior of the second user device exceeds a predetermined threshold based on comparing, taking further action to protect the wireless local area network.

2. The method according to claim 1, wherein the unique password is generated by a network owner on an appliance portal of the wireless local area network or by a device owner on a captive portal.

3. The method according to claim 1, further comprising employing a Wi-Fi protected access (WPA) protocol for enforcing use of each unique password for each user device of the one or more user devices.

4. The method according to claim 1, wherein associating the one or more unique passwords with the respective one or more user devices further comprises generating an identifier for each user device based on each unique password of each user device.

5. The method according to claim 1, further comprising detecting, by a wireless computer network access point, a new user device of the wireless local area network and requesting a unique password of the new user device from a user of the new user device.

6. The method according to claim 1, further comprising allowing the user device to access the wireless local area network after identifying the user device based on the unique password; and blocking any other user device that uses the same unique password from accessing the wireless local area network while the user device is connected to the wireless local area network.

7. The method according to claim 1, further comprising: in response to detecting the unique password of the user device being already in use by another user device of the wireless local area network, requesting a new unique password from the user device and alerting a network owner.

8. The method according to claim 1, wherein taking further action comprises one or more of revoking an abused password, escalating a security incident, and sending a notification to a network owner.

9. An apparatus in a computer network system comprising:
   one or more processor devices; and
   a non-transitory computer-readable medium comprising stored program code, the program code comprising computer-executable instructions that, when executed by the one or more processor devices, cause the one or more processor devices to:
     receive one or more unique passwords for identifying respective one or more user devices of a wireless local area network;
     associate the one or more unique passwords with the respective one or more user devices;
     store the one or more unique passwords to a database;
     request, from a user device, a unique password of the user device in response to receiving, at an access point of the wireless local area network, a connection request from the user device;
     identify the user device based on the unique password;
     monitor the behavior of the one or more user devices connected to the wireless local area network during a first time period and during a second time period;
     compare behavior of a first user device using a first unique password during the first time period with behavior of a second user device using the same first unique password during the second time period; and
     in response to detecting that a difference score between the behavior of the first user device and the behavior of the second user device exceeds a predetermined threshold based on comparing, take further action to protect the wireless local area network.

10. The apparatus according to claim 9, wherein the unique password is generated by a network owner on an appliance portal of the wireless local area network or by a device owner on a captive portal.

11. The apparatus according to claim 9, wherein the computer-executable instructions further cause the one or more processor devices to employ Wi-Fi protected access (WPA) protocol for enforcing use of each unique password for each user device of the one or more user devices.

12. The apparatus according to claim 9, wherein to associate the one or more unique passwords with the respective one or more user devices, the computer-executable instructions further cause the one or more processor devices to generate an identifier for each user device based on each unique password of each user device.

13. The apparatus according to claim 9, wherein the computer-executable instructions further cause the one or more processor devices to detect a new user device of the wireless local area network and to request a unique password of the new user device from a user of the new user device.

14. The apparatus according to claim 9, wherein the computer-executable instructions further cause the one or more processor devices to allow the user device to access the wireless local area network after identifying the user device based on the unique password, and to block any other user device that uses the same unique password from accessing the wireless local area network while the user device is connected to the wireless local area network.

15. The apparatus according to claim 9, wherein the computer-executable instructions further cause the one or more processor devices to request a new unique password from the user device and alerting a network owner in response to detecting the unique password of the user device being already in use by another user device of the wireless local area network.

16. The apparatus according to claim 9, wherein the further action comprises one or more of revoking an abused password, escalating a security incident, and sending a notification to a network owner.

17. A non-transitory computer-readable medium comprising stored program code, the program code comprising computer-executable instructions that, when executed by a processor device, cause the processor device to:
- receive one or more unique passwords for identifying respective one or more user devices of a wireless local area network;
- associate the one or more unique passwords with the respective one or more user devices;
- store the one or more unique passwords to a database;
- request, from a user device, a unique password of the user device in response to receiving, at an access point of the wireless local area network, a connection request from the user device;
- identify the user device based on the unique password;
- monitor the behavior of the one or more user devices connected to the wireless local area network during a first time period and during a second time period;
- compare behavior of a first user device using a first unique password during the first time period with behavior of a second user device using the same first unique password during the second time period; and
- in response to detecting that a difference score between the behavior of the first user device and the behavior of the second user device exceeds a predetermined threshold based on comparing, take further action to protect the wireless local area network.

18. The non-transitory computer-readable medium according to claim 17, wherein to associate the one or more unique passwords with the respective one or more user devices, the computer-executable instructions further cause the processor device to generate an identifier for each user device based on each unique password of each user device.

* * * * *